United States Patent

Aruga et al.

[11] Patent Number: 5,764,441
[45] Date of Patent: Jun. 9, 1998

[54] HEAD ACTUATOR HAVING REDUCED AND CONTROLLED VIBRATION CHARACTERISTICS FOR HIGH SPEED DISK DRIVE SYSTEMS

[75] Inventors: Keiji Aruga, Hiratsuka; Yasumasa Kuroba, Isehara; Tomoyoshi Yamada, Yokohama, all of Japan

[73] Assignee: Fujitsu Limited, Kawasaki, Japan

[21] Appl. No.: 636,802

[22] Filed: Apr. 23, 1996

[30] Foreign Application Priority Data

Apr. 28, 1995 [JP] Japan .................. 7-106424

[51] Int. Cl.$^6$ .................................................. G11B 5/55
[52] U.S. Cl. .................................................. 360/106
[58] Field of Search .................................................. 360/106

[56] References Cited

U.S. PATENT DOCUMENTS

| | | | |
|---|---|---|---|
| 4,620,252 | 10/1986 | Bauck | 360/106 |
| 5,119,253 | 6/1992 | Kotani | 360/106 |
| 5,233,493 | 8/1993 | Eliason | 360/106 |
| 5,267,110 | 11/1993 | Ottesen | 360/106 |
| 5,486,965 | 1/1996 | Yoshida | 360/106 |

FOREIGN PATENT DOCUMENTS

| | | |
|---|---|---|
| 0 355 692 | 2/1990 | European Pat. Off. . |
| 43 14 167 | 11/1993 | Germany . |

*Primary Examiner*—A. J. Heinz
*Attorney, Agent, or Firm*—Staas & Halsey

[57] ABSTRACT

A rotary moving coil actuator in a disk drive selectively positions a read/write head with respect to disk medium. A carriage is pivotable about an axis and has a carriage arm for supporting the head. A pair of magnets, disposed in spaced relationship within a magnetic yoke structure, have spaced flat faces perpendicular to the axis and define a gap therebetween. A flat coil structure, comprising one or a pair of flat coils, is attached to the carriage and disposed at least in part within the gap between the opposing flat faces of the magnets so as to be movable along a stroke of movement relatively thereto. The flat coil structure in cooperation with the magnets, generates a driving force in a direction approximately parallel to a first line which is perpendicular to the axis and passes through the axis and toward the read/write head and thereby substantially perpendicular to the seek direction of the head.

39 Claims, 8 Drawing Sheets

FIG. 12A
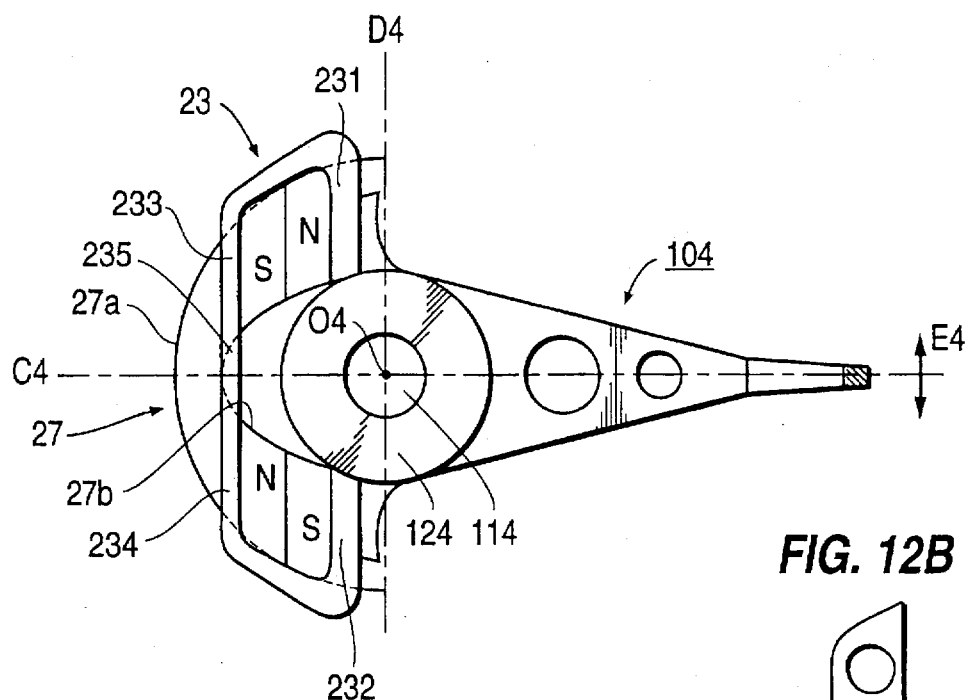
FIG. 12B
FIG. 13
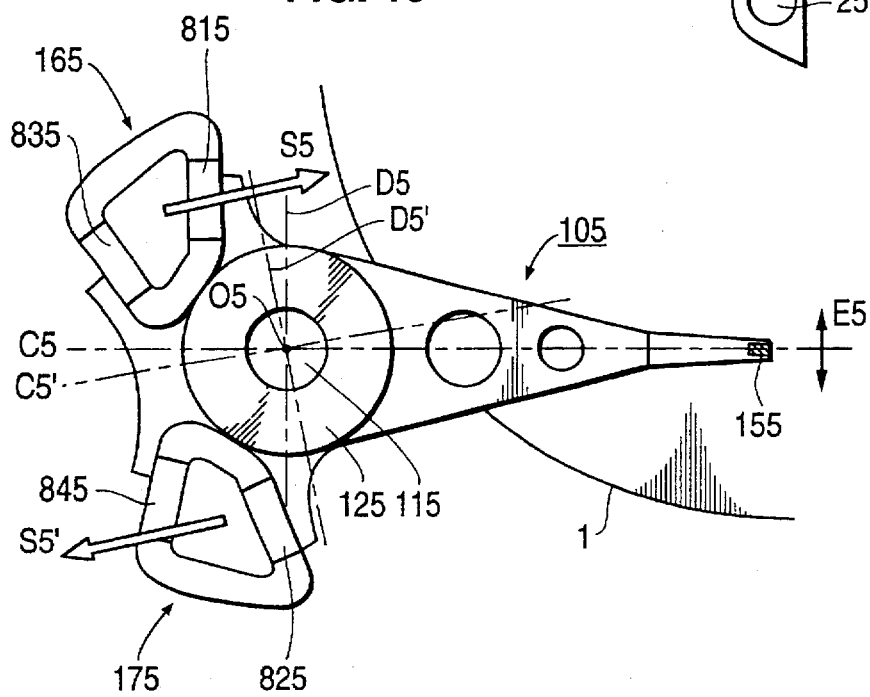

HEAD ACTUATOR HAVING REDUCED AND CONTROLLED VIBRATION CHARACTERISTICS FOR HIGH SPEED DISK DRIVE SYSTEMS

BACKGROUND OF THE INVENTION

1. Field of the Invention

The present invention relates to a disk drive, such as a magnetic disk drive, a magnetic disk cartridge drive or an optical disk drive, which is widely used as an external storage device for a computer and, more particularly, to a disk drive which has an improved head actuator for selectively positioning a read and/or write head with respect to the rotating disk storage medium.

2. Description of the Related Art

A magnetic disk drive has remarkably improved, in recent years, the storage density of a magnetic disk as a storage medium, and has increased its storage capacity by a factor of at least 10 times during the period of about 10 years. Improvement in the storage density can be realized in both a circumferential direction and a track direction of a magnetic disk. The former is represented by the number of bits per inch ("BPI") and the latter is represented by the number of tracks per inch ("TPI"). Particularly, the number of TPI has now reached 4,000 TPI (6.0 μm in track pitch) and is expected to be further increased to 10,000 TPI (2.5 μm in track pitch).

In view of further increasing the TPI density of a magnetic disk, it is important to improve a magnetic head and a magnetic disk thereof and, particularly, to improve the head positioning technology. At a density of 10,000 TPI, the track pitch becomes 2.5 μm and the tolerable positioning error is about 10% of the pitch, that is, 0.25 μm or less.

Meanwhile, a disk drive must be downsized for use in a portable personal computer. Accordingly, disturbances (e.g., shock or vibration) to the disk relatively increase. Further, it is difficult to satisfy the two inconsistent factors of increasing disturbances and decreasing tolerable positioning errors.

A basic solution for this problem is to provide a head positioning servo system having a wide servo band. However, an inherent vibration characteristic of a head actuator prevents the servo system from obtaining a sufficiently wide servo band. The resonance frequency of a typical actuator is generally several kHz and it has been almost impossible to obtain the servo band of 1 kHz or higher. If the servo band were unreasonably widened under this condition to include the actuator resonance frequency, the control system would become unstable and the positioning accuracy would decrease.

Therefore, the servo band has been widened using a double-actuator in a certain optical disk drive where the track pitch is about 1.5 μm. Thereby, the servo band can be improved up to about 2 kHz. It is also possible to introduce, into a magnetic disk drive, the double-actuator which has been used for an optical disk drive, and many various attempts to do so have been conducted. However, these attempts cannot yet be put into commercial use. Because a magnetic disk drive has about 10 to 20 heads, it is impractical to use such a large number of double-actuators from the viewpoints of price and weight. Especially since magnetic disk drives recently are in a trend of significant cost reduction, it is considerably difficult to employ technology which results in an increase of cost. Meanwhile, although only one head is used in a typical optical disk drive, realization of low cost is also precluded by the double-actuator and a complicated control system required for driving such a double-actuator.

In the future, if a micro-actuator integrated with a head element may be realized with a micro-machine technology, commercial use of the double-actuator can also be considered even for a magnetic disk drive. However, it is certainly most practical, at present, to widen the servo band of a typical single actuator.

When the rigidity of the actuator is increased from the viewpoint of the design, the resonance frequency of one type can be raised, but the resonance frequency of another type may be lowered. The former is a resonance frequency in an "elastic body mode" and the latter is a resonance frequency in a "rigid body mode". The resonance frequency of the elastic body mode is caused by elasticity of the actuator itself, and the resonance frequency of the rigid body mode is caused by a spring characteristic between a movable part and a stationary part through a bearing while maintaining the actuator as an almost rigid body. The resonance frequency of the rigid body mode is inversely proportional to a square root of the mass of the body when the spring characteristic is constant, and is lower in frequency than the resonance frequency of the elastic body mode.

Accordingly, when the rigidity of the actuator is increased, the resonance frequency of the elastic body mode rises, however, this creates a problem of the resonance frequency of the rigid body mode being lowered due to an increase in the weight (mass) of the actuator, in addition to creating a further problem that the access performance is lowered due to a heavier actuator. Meanwhile, when the weight of the actuator is decreased, the resonance frequency in the rigid body mode is increased. However, the resonance frequency of the elastic body mode is lowered due to a decrease of the rigidity of the actuator. Therefore, it is essentially impossible to realize respective, higher resonance frequencies of both the rigid body mode and the elastic body mode.

FIG. 1 is a top view of a conventional head actuator using a single coil unit, which generally has been used in the prior art. FIG. 2 shows a vibration-frequency characteristic of such a prior art actuator. In FIG. 1, a head actuator 50 has a head 51 for reading/writing data from/to a rotating magnetic disk 52, a suspension arm 57 supporting the head 51, a carriage arm 53 supporting the suspension arm 57, a bearing 54, a stationary shaft 55 for rotatably supporting the carriage arm 53 through the bearing 54, and a coil 56 attached to the arm 53. The coil 56 generates driving forces F and F' in cooperation with a magnet not shown in FIG. 1. Thereby, the head 51 swings along a head positioning direction (i.e., a seek direction) represented by an arrow E.

In FIG. 2, a peak 61, corresponding to the resonance frequency of the actuator 50 in the rigid body mode, occurs at a frequency of several kHz. The vibration in the rigid body mode of the actuator 50 produces a displacement of the actuator 50 indicated by a chain line 59 of FIG. 1, the direction of 59 being parallel to the seek direction E, because the driving forces F and F' are generated in the direction parallel to the seek direction E. Especially, the driving forces F and F', generated during a transition from a stationary position to a condition of movement, produces the vibration in the direction parallel to the seek direction E. Accordingly, the servo band is designed to be below the frequency where the peak 61 appears, because the head positioning error may become larger at such frequency. Meanwhile, a peak 62, corresponding to the resonance frequency of the elastic body mode, occurs at the frequency higher than the resonance frequency of the rigid body mode.

SUMMARY OF THE INVENTION

Accordingly, it is an object of the present invention to provide a disk drive in which the above-explained problem of the rigid body mode is reduced. Such a basic concept is disclosed in the Japanese Patent Laid-Open No. HEI 3-80475 by the assignee of the present invention. To reduce the problem of the rigid body mode, this patent application has proposed a head actuator which generates a driving force in a direction perpendicular to the head positioning direction. Since the vibration of the rigid body mode occurs in a direction perpendicular to the head seek direction when the driving force is applied to the actuator, such vibrations produce only a minor head positioning error. Strictly speaking, the head positioning direction does not perpendicularly cross the circumferential direction of the disk medium due to an existence of a yaw angle, but such a yaw angle has only a small influence because the yaw angle is within 20°.

It is a further object of the present invention to provide a disk drive which mounts the head actuator while avoiding any interference between the disk medium and the head actuator while achieving the above object. Of course, one may propose to substantially extend the distance between the disk medium and the head actuator to achieve this result, but it is not easy to accommodate such an enlarged actuator in the limited space of a practical disk drive.

It is a still further object of the present invention to provide a disk drive which mounts the head actuator so as to reduce frictional reaction of the bearing by a balanced drive using a pair of coils while achieving the above objects. To reduce the bearing reaction, some balanced drives using a pair of coils are described in the Japanese Patent Laid-Open Nos. SHO 59-116965, HEI 5-54565 and HEI 6-124553. However, these prior art drives are also accompanied by a practical problem in that it is very difficult to mount the head actuator efficiently in the limited space of a disk drive while avoiding interference with a disk medium.

The foregoing objects of the present invention are achieved by providing a disk drive which includes a rotary moving coil actuator for selectively positioning a read/write head with respect to a rotating disk medium, and wherein the actuator comprises (a) a carriage being pivotable about an axis and having a carriage arm for supporting the head, (b) a pair of magnets having a flat face, and (c) a pair of flat coils attached to the carriage, facing the flat faces of the magnets and being movable along and between the magnets. The flat coils respectively generate a driving force in cooperation with the magnet and in a direction approximately parallel to a first line which passes through the axis and the head is perpendicular to the axis.

Therefore, as shown in FIG. 3, which illustrates the principle of the present invention, when the head 71 is positioned with respect to the surface of the rotating disk 72, as the storage medium, the moving coil generates a driving force F" in the direction perpendicular to the seek direction E1. Accordingly, even though mechanical vibrations might appear in the direction E1, such mechanical vibrations effectively produce no head positioning error because a disk drive has a large acceptable margin against such mechanical vibrations. Moreover, since the coil is formed as a flat coil arranged in a plane parallel to the disk medium, the actuator can be mounted within the space of a comparatively thinner disk drive, thereby to improve the mounting efficiency.

BRIEF DESCRIPTION OF THE DRAWINGS

FIG. 12A is an alternative embodiment of the present invention in which the head actuator has a trapezoidally shaped flat coil and FIG. 12B is an illustration of a reinforcement block which is incorporated in the flat coil of the head actuator of FIG. 12A.

FIG. 13 is an alternative embodiment of the present invention in which the head actuator has increased tolerance for avoiding interference between disks and heads.

DESCRIPTION OF THE PREFERRED EMBODIMENTS

Figure 4:
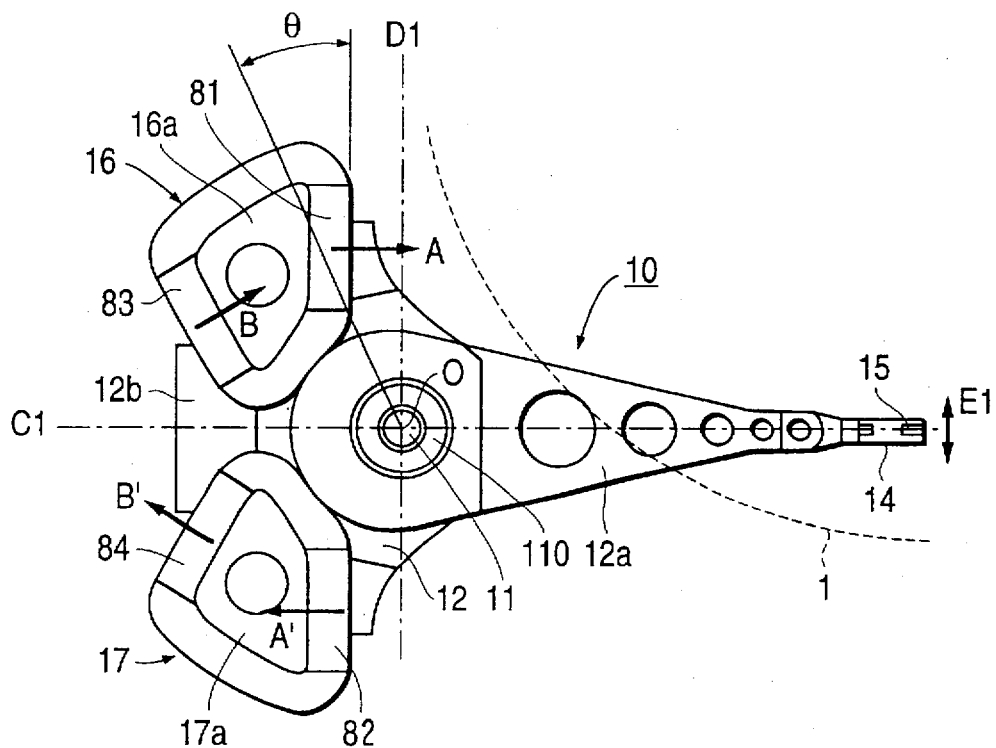
FIG. 4 is a top plane view of a preferred embodiment of the improved head actuator of the present invention.
Figure 5A:
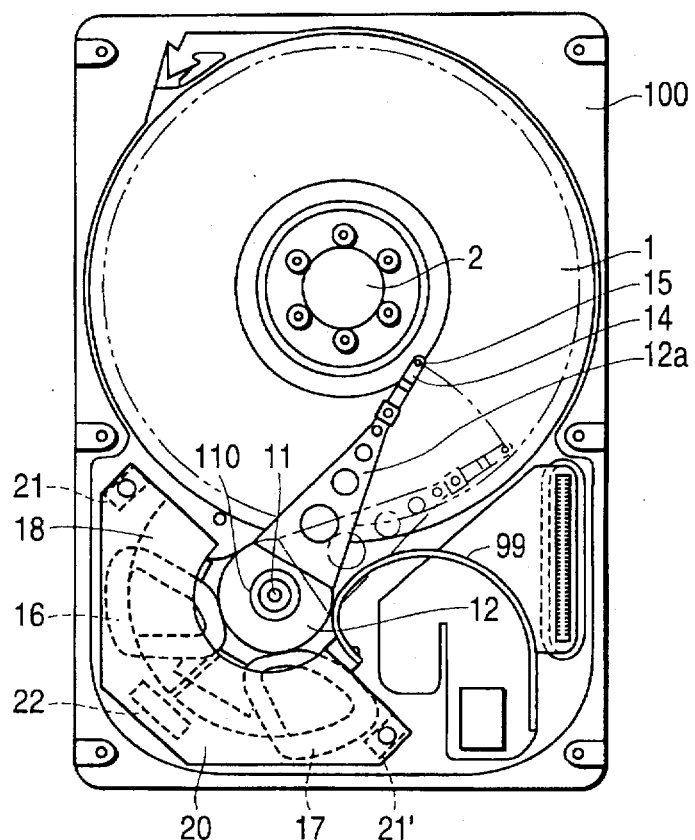
FIG. 5A is a top view of a disk drive using the head actuator of FIG. 4.
Figure 5B:
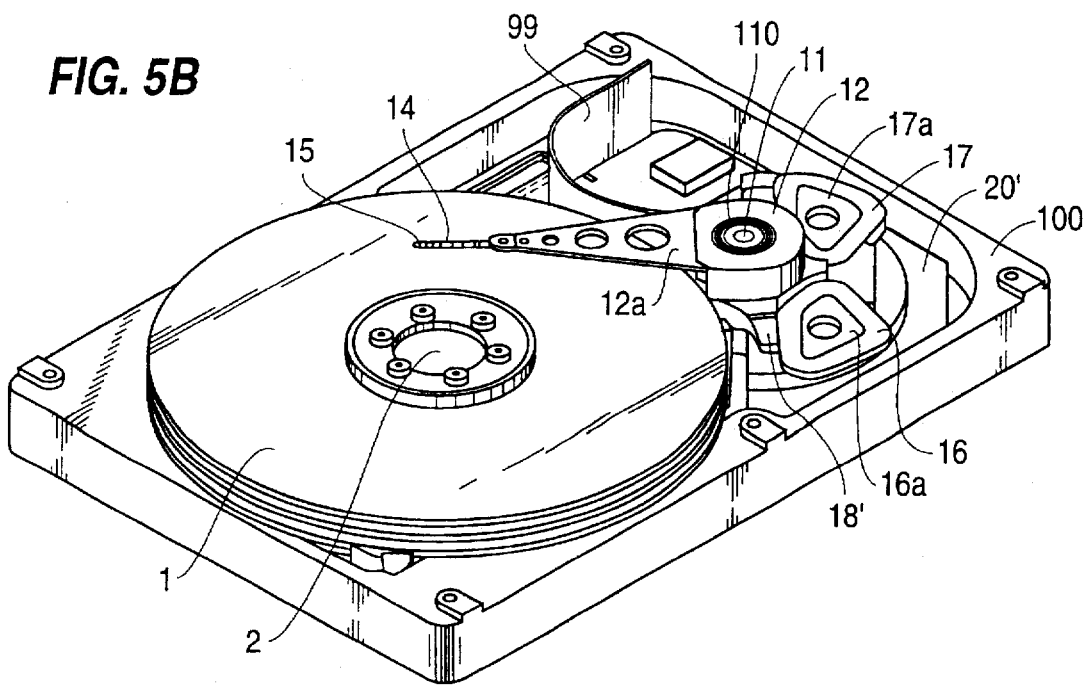
FIG. 5B is a perspective view of the disk drive of FIG. 5A.

FIG. 4 is a top plane view of a preferred embodiment (first embodiment) of the improved head actuator of the present invention, FIG. 5A is a top plane view of a 3.5-inch disk drive utilizing the head actuator of FIG. 4 and FIG. 5B is a perspective view of the disk drive of FIG. 5A. A plurality of circular disks 1 are stacked in the vertical direction while keeping predetermined spaces therebetween, as the magnetic storage media rotate in common on the spindle shaft 2.

A movable part of the actuator 10 comprises a carriage 12 having a plurality of carriage arms 12a, integral with and extending radially from a coil mounting base 12b rotatably mounted on a shaft 12, a plurality of suspension arms 14 extending, respectively, from the plurality of carriage arms 12a and carrying on the free ends thereof a respective plurality of magnetic read/write heads 15 and, further, a pair of moving flat coils 16 and 17. A bearing 110 is mounted on the shaft 11 and rotatably supports the movable part of the actuator 10 on the shaft 11. A stationary part of the actuator 10 comprises the shaft 11 and a magnetic circuit respectively fixed on an enclosure 100 (FIG. 5A) of the disk drive. The magnetic circuit comprises a pair of flat permanent magnets 18 and 18' which are of substantially identical configuration and are disposed in spaced, parallel relationship and which receive the pair of moving coils 16 and 17 therebetween. The upper magnet 18 (i.e., "upper", as in the orientation of FIGS. 5A and 5B) is shown in FIG. 5A but is removed in FIG. 5B to facilitate illustration of the coils 16 and 17. The magnetic circuit further comprises a pair of main yoke plates 20 (FIG. 5A) and 20' (FIG. 5B) of the same configuration and spaced apart to define a gap therebetween, a pair of side yoke blocks 21 and 21' which interconnect the yoke plates 20 and 20', and a back yoke block 22 which likewise interconnects the yoke plates 20 and 20'.

The carriage arms 12a extend to and can overlap and move along, and relatively to, the corresponding surfaces of the respective disks 1. The heads 15 are respectively mounted on the ends of the corresponding suspension arms 14 and the suspension arms 14 are respectively mounted on the corresponding ends of the carriage arms 12a. The coils 16 and 17 are mounted on the coil mounting base 12b at the opposite side of the shaft 11 from the heads 15 and between the magnets 18 and 18', and are movable within the gap between, and relatively to the surfaces of, the magnets 18 and 18'. Meanwhile, the coils 16 and 17 are symmetrically disposed with respect to, and on opposite sides of, a plane which substantially includes both the axis O and a line C1 which passes through the shaft 11 and the heads 15

The heads 15 are selectively positioned in the seek direction E1 by selective rotation of the carriage 12. The heads 15 stay in contact with the surface of the disks 1 while the rotation of the disks 1 has stopped, and the heads 15 are positioned close to but spaced from the surfaces of the disks 1 while the disks 1 are rotating.

The coils 16 and 17 are flat, coreless-type coils and respectively have front portions 81 and 82 and rear portions 83 and 84. The coil portions 81–84, in cooperation with the magnets 18 and 18' respectively generate driving forces A, A', B and B'. Especially, the front portions 81 and 82 respectively generate the driving forces A and A' in opposite directions, precisely parallel to the line C1, and extend in a direction parallel to a line D1 which perpendicularly crosses the line C1 and passes through the axis O. Since the coils 16 and 17 are symmetrically disposed with respect to the plane including the axis O and the line C1, the coils 16 and 17 generate respective driving forces which are substantially oppositely and symmetrically oriented, with respect to the plane.

In order to obtain a well balanced and readily mountable head actuator, the front portions 81 and 82 are disposed with a predetermined offset and at an opposite side of the line D1 (and thus of the axis of rotation O) from the heads 15, and the rear portions 83 and 84 are not exactly parallel to the front portions 81 and 82 but are inclined so as to be approximately parallel to a radial direction, relatively to the shaft 11.

The coils 16 and 17 generate a certain loss from the viewpoint of rotational torque, because the driving forces A, A', B and B' deviate slightly from a rotating direction relatively to the axis O. However, in practice, since a torque T is expressed by the following formula:

$$T = F \cdot r \cdot \cos \theta \qquad \text{Equation (1)},$$

where $\theta$ is deviation angle of the coil from the radial direction, such a loss is not great and may be as small as 7%, for example, when $\theta = 20°$.

Moreover, an arrangement of the coils 16 and 17 is closely related to an arrangement of the magnetic poles of the magnetic circuit for the required stroke of the head and the required rotating angle of the head actuator; therefore, the coils 16 and 17 and the magnetic circuit must be designed so as to cooperate properly. Reinforcing blocks 16a and 17a, moreover, are disposed within the respective coils 16 and 17 and serve both for defining and maintaining (i.e., reinforcing) the shape of the coils 16 and 17, which may be wound thereabout, and also for counterbalancing the actuator with respect to the arm extensions, etc., disposed on the opposite side of the rotating drive shaft 11.

Figure 6:
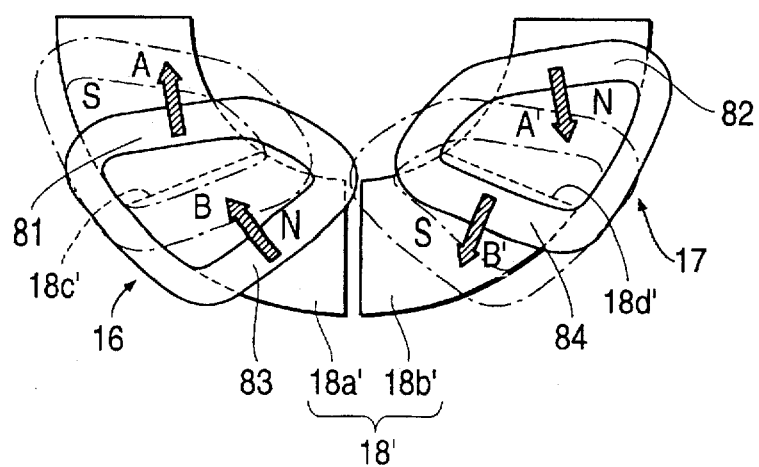
FIG. 6 shows an arrangement of the magnets and the coils of FIG. 5A.

FIG. 6 shows an arrangement of the coils 16 and 17 of FIGS. 4, 5A and 5B, from an initial (solid line) position and as moved to a displaced, dotted line position, relatively to the lower magnet 18'. More particularly, the lower magnet 18' comprises two magnets 18a' and 18b' respectively defining N and S (two) poles each, for a total of four poles. The coil portions 81–84 are movable relatively to the corresponding poles (and within the gap between the lower magnet 18' and the upper magnet 18).

The arrangement of the coil portions 81 (81') and 82 (82') of the embodiment shown in FIGS. 4–6 is perfect from the viewpoint of the direction of the driving forces A and A', because the driving forces A and A' are exactly perpendicular to the seek direction E1 and are practically, exactly balanced about the shaft 11. The bearing reaction this is reduced, due to the balanced driving forces. Moreover, since the front portions 81 and 82 are disposed with an offset from the axis O of shaft 11 (and thus from the line D1 or from a plane passing through the line D1 and in which the axis O lies) to prevent any interference with the disks 1, the driving forces A and A' slightly deviate from the rotating direction. However, the front portions 81 and 82 are at an angle, relatively to the radial direction, of about $\theta = 25°$ in this embodiment (see FIG. 4). Accordingly, a rotating efficiency of the driving forces A and A' is 91% (cos 25°) which is obtained from the above formula (1), and the loss of the driving forces A and A' is merely 9%.

The arrangements of the rear portions 83 and 84 are a compromise between the direction perpendicular to the seek direction and the loss of the driving forces B and B'. In this embodiment, angles of the rear portions 83 and 84 relative to the radial direction are about 30°. Accordingly, a rotating efficiency of the driving forces B and B' is 86%, that is, the loss of the driving forces B and B' is only 14%. In total, the rotating efficiency is about 88%.

Figure 1:
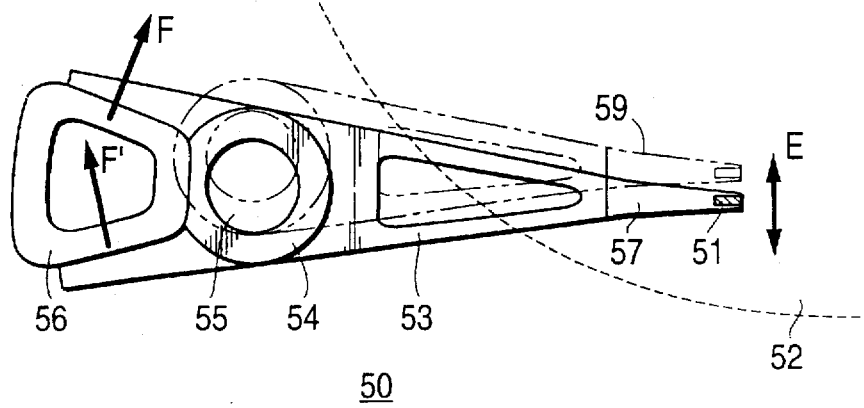
FIG. 1 is a top plane view of a conventional head actuator using a single coil unit.
Figure 3:
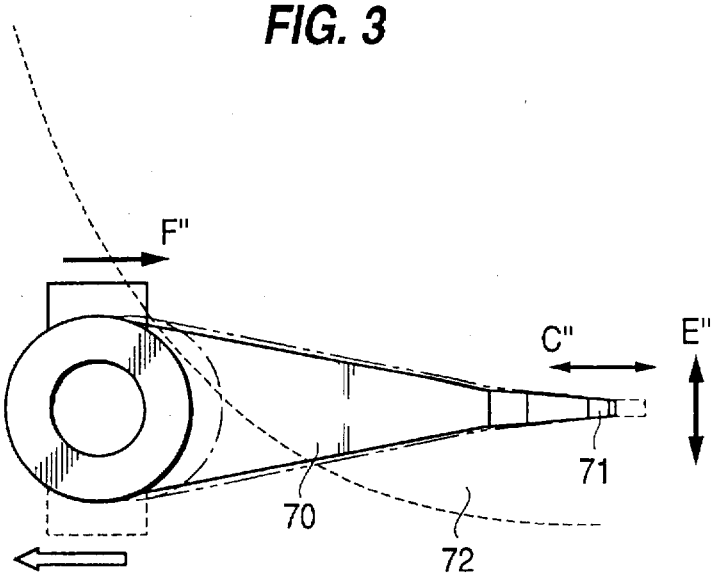
FIG. 3 is a top plane view of a head actuator for explaining the principle of the present invention.

Meanwhile, the angles of the rear portions 83 and 84 relative to the seek direction E1 are also about 30° in this embodiment. Accordingly, a force component in the seek direction E1 is about 50% of the driving forces B and B' while a force component of the driving force A and A' is zero in the seek direction E1. In total, the force component in the seek direction E1 is about 25%. This unbalanced force component in the seek direction has been reduced to about ¼, considering that almost all the driving forces F and F' of the prior art, as shown in FIG. 1, produce an unbalanced force component in the seek direction E.

Accordingly, the bearing reaction in the seek direction E1 has been reduced to about ¼, and this is equivalent to the peak gain of the rigid body mode being reduced by as much as 12 dB. The peak gain in the rigid body mode is generally about 10–20 dB due to the bearing reaction when vibration of the rigid body mode is not incorporated with vibration of the other modes. Accordingly, when the head actuator of this embodiment shown in FIG. 4–6 is used, the peak gain becomes about 0–8 dB, a level which may be ignored.

In a rotating actuator, it is also important to arrange the center of balance on an axis of rotation, from the viewpoint of an anti-disturbance characteristic. In this embodiment, the moving part of the actuator is symmetrically arranged about the line C1 which passes through the shaft 11 and the heads 15. The rear portions 83 and 84 also work as balancers for the heads 15 and the carriage arms 12a, thereby to realize almost perfect balance for rotation.

An actuator using a single flat coil (only one of the coils 16 or 17 in FIG. 4) can also obtain a good vibration characteristic. Since an object of the present invention is to provide both a good vibration characteristic and a good mountable coil structure, this single coil actuator is encompassed within the present invention. In practical use, it is preferable to mount a balancer at the opposite side of the shaft 11 from the single coil to obtain the balance of rotation.

The efficiency of the dual coil actuator shown in FIG. 4 is described hereunder. The moment of inertia of the coils 16 and 17 is about ½ (50%) that of the total moment of the movable part, and the moment of inertia of the heads 15 and the carriage arms 12a is about ½ (50%) that of the total. Considering the use of the single coil, the moment of inertia of the single coil actuator is about ¾ (75%) that of the dual coil actuator, and the total driving force of the single coil actuator is ½ that of the dual actuator when the same current is applied to each coil. Accordingly, an acceleration per unit of current of the single coil actuator is about $(1/(3/4))\times(1/2)=2/3$, or (67%), that of the dual coil actuator. On the other hand, the amount of electric power which the single coil actuator requires, to obtain the same acceleration is about 3/2 (150%) relative to that of the dual coil actuator.

Figure 7:
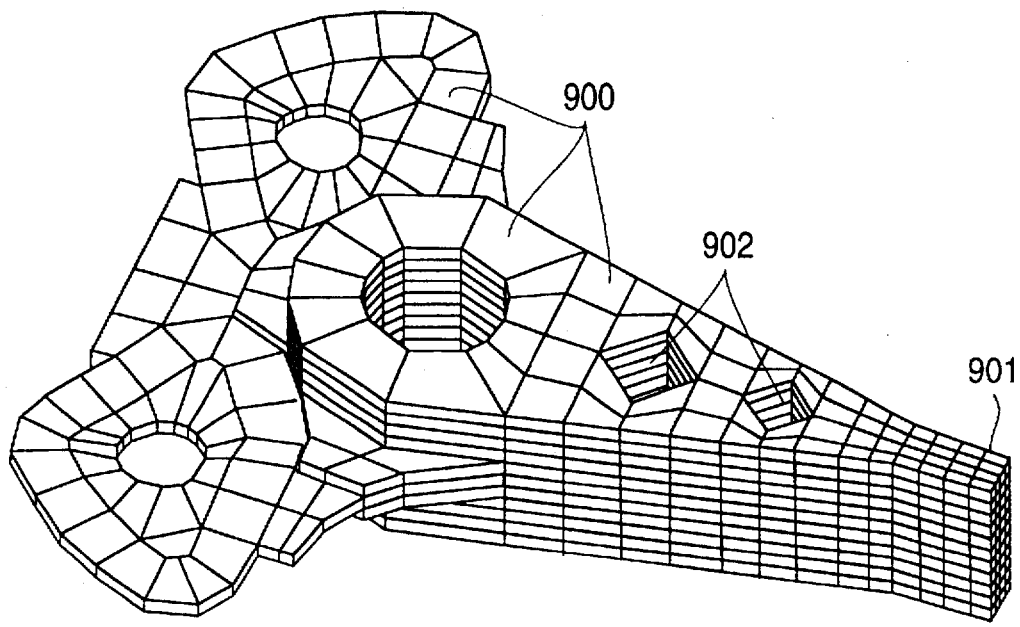
FIG. 7 shows a three dimensional model for analysis of the movable part of the head actuator of FIG. 4.

FIG. 7 shows a three dimensional model for analysis of the movable part of the head actuator of FIG. 4. In a computer simulation, the head actuator is modeled as a set of a plurality of small finite elements 900. The bearing is modeled as a linear spring in the simulation. The suspension arms and the heads are given only a mass as elements 901. Therefore, the actuator is considered as a whole, but the vibration characteristics of the individual suspension arms are not considered. Designs for the rigid body mode are based on the arrangements of the coils as described above. Moreover, designs for the elastic mode are based on the arrangements of the carriage arms which are formed wider and particularly wider near the shaft. The wider carriage arms have increased rigidity; however, an increase of mass near the shaft does not causes a serious increase in the moment of inertia. Moreover, in order to obtain a light actuator, holes 902 are formed in the carriage arms while, nevertheless, maintaining sufficient rigidity of the carriage arms.

Figure 8A:
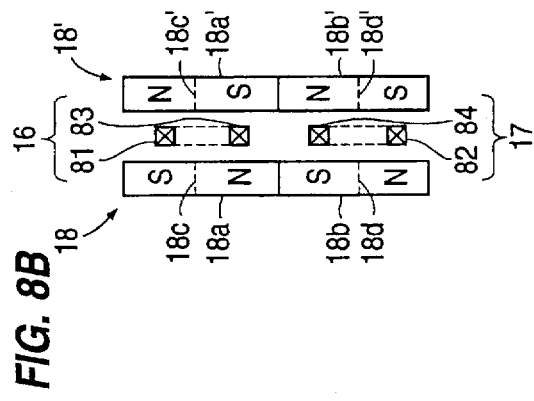
FIG. 8A is a top plane view of a four-pole magnet and the carriage arm of FIGS. 5A and 5B.
Figure 8B:
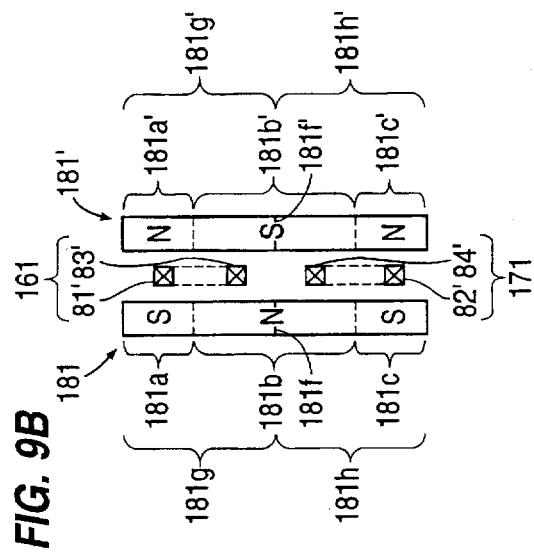
FIG. 8B is a sectional view taken substantially along a line 8B–8B' of FIG. 8A.

FIG. 8A is a top plane view of a four-pole magnet arrangement on the carriage 10 of FIGS. 4, 5A and 5B. FIG. 8B is a sectional view taken in a curved plane substantially along an arcuate (circumferential) line 8B–8B' in FIG. 8A. The upper magnet 18 is constructed of the magnets 18a and 18b and has a four-pole arrangement of S-N-S-N as shown in FIGS. 8A and 8B. The lower magnet 18' is constructed of magnets 18a' and 18b' and has a four-pole arrangement of N-S-N-S, which respectively face the opposite poles S-N-S-N of the upper magnet 18.

The pair of magnets 18 and 18' generates four magnetic fields therebetween, the successive, adjacent fields alternating in opposite directions. The portions 81–84 of the coils are moveable within the gap and relatively to the opposing, parallel surfaces of the magnets 18 and 18', and thus are respectively moveable through the corresponding magnetic fields defined by the four poles. The magnets 18a and 18b (18a' and 18b') respectively have pole boundaries 18c and 18d (18c' and 18d')(i.e., interfaces between the N and S poles) which are not in the radial direction but are inclined (i.e., angularly displaced) relatively to a radial direction from the axis O and relatively to the inclination of the corresponding rear coil portions 83 and 84 as shown in FIG. 6. More particularly, these pole boundaries 18c and 18d are inclined at an angle δ of about 30° relatively to the radial direction.

Figure 9A:
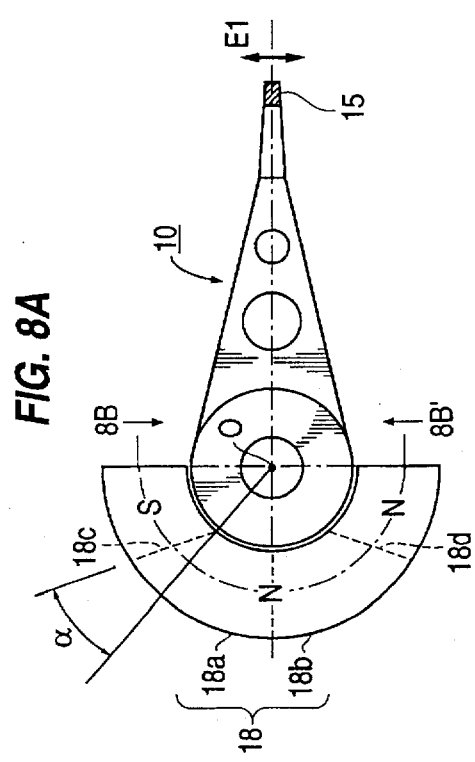
FIG. 9A is a top plane view of an alternative three-pole magnet and an associated carriage arm.
Figure 9B:
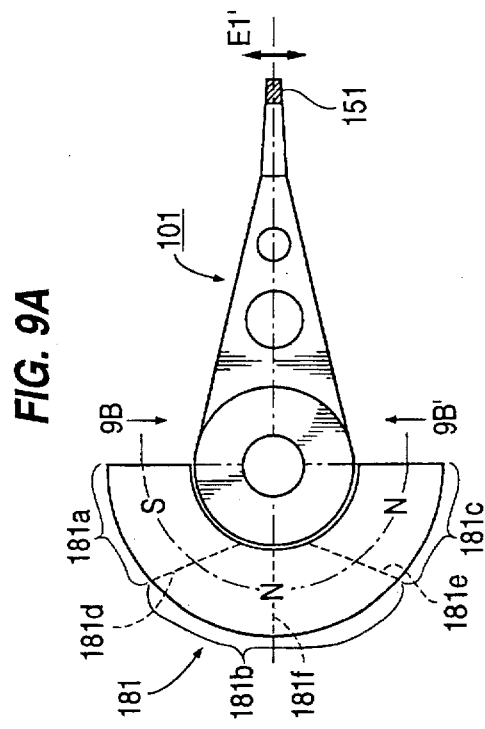
FIG. 9B is a sectional view taken substantially along a line 9B–9B' of FIG. 9A.

FIG. 9A is a top plane view of an alternative, three-pole magnet arrangement and carriage 101. FIG. 9B is a sectional view taken in a curved plane coaxial with the axis O and passing substantially along an arcuate line 9B–9B' of FIG. 9A. The magnets 181 and 181' respectively have three-pole arrangements of S-N-S and N-S-N. The magnet 181 has a circumferential central pole 181b which is about twice as long as the oppositely disposed circumferential end poles 181a and 181c, taken in the direction of the circumferential line 9B-9B' of x FIG. 9A, and two (radial) pole boundaries 181d and 181e which have the same respective inclinations as the pole boundaries 18c and 18d of FIG. 8A. The magnet 181' is likewise configured. These magnets 181 and 181' generate three magnetic fields therebetween, the central poles 181b and 181b' effectively being shared by both of the opposite end poles and correspondingly being designated as 181g (181g') and 181h (181h') in FIG. 9B. As compared with the magnets 18b and 18b' of the four-pole magnet arrangement of FIGS. 8A and 8B, however, portions 181h and 181h' of the three-pole magnets 181 and 181' generate magnetic fields having opposite relative directions. Specifically, in comparing FIG. 9B with FIG. 8B, the fields generated by the magnet portions 181g and 181g' (respectively relating to the end poles 181a and 181a' with respect to a first segment of the central poles 181b and 181b' correspond to the magnetic field of the magnets 18a and 18a' in FIG. 8B to which the first coil 16 is subjected. On the other hand, the magnet portions 181h and 181h' respectively including the pole portion 181c and a contiguous segment of the central pole portion 181b and the pole portion 181c' and a contiguous segment of the central pole 181b', produce a field of an opposite direction, or sense, relatively to that produced by magnets 18b and 18b' in FIG. 8B; thus, the corresponding coil 171 of FIG. 9B is provided with an oppositely directed current relative to the current supplied to coil 17 in FIG. 8B. Accordingly, the actuator 101 has the coils 161 and 171 with the same shape as the coils 16 and 17 used in the four-pole magnet arrangement, however, the coils 161 and 171 are wired so that a current provided to the coil 171 is reversed.

An actuator using this three-pole magnet arrangement of FIGS. 9A and 9B has the following advantages, relatively to the four-pole magnet arrangement of FIGS. 8A and 8B. (1) The three-pole magnet arrangement increases a peak of the magnetic flux density between the magnets and a torque coefficient, as defined by the magnetic flux density, because of eliminating one pole boundary and having a longer central pole. (2) The torque coefficient becomes more uniform. Generally, the torque coefficient slightly decreases when portions of coils are located near pole boundaries or edges of the magnets. In the four-pole magnet arrangement, all portions 81–84 of the coils 16 and 17 are located near the pole boundaries or the edges of the magnets when the heads 15 are positioned on the inner-most or outer-most tracks. However, in the three-pole magnets, one of the rear portions 83' and 84' is not located near a pole boundary but rather is located near a center portion 181f of the central pole 181b when the heads 15' are positioned on the inner-most or outer-most tracks. (3) Design of the coils is freer than that of the coils of the four-pole magnets. Generally, the coils should be designed so that each portion of a coil does not move beyond the pole boundaries of its associated magnet. In the three-pole magnets and since the center 181f of the central pole 181b is not a pole boundary, the rear portions 83' and 84' may move beyond the center 181f of the central pole 181b and yet not be beyond a pole boundary.

Meanwhile, the actuator using the three-pole magnet has the following disadvantage. Since the magnetic density in the yoke is larger than that of the four-pole magnet, the yoke is required to be larger to obtain a higher saturation point for a larger magnetic density. Therefore, the three-pole magnet arrangement is preferable when there is sufficient space for the magnetic circuit but is not, when space is limited; instead, the four-pole magnet arrangement is preferable when there is not sufficient space to mount a larger actuator into the compact magnetic disk drive.

In order to cancel the saturation of magnetic density in the yoke, it is preferable to mount the side yoke blocks 21 and 21' and the back yoke block 22 outside the stroke of movement of coils (FIGS. 5A and 5B). The side yoke blocks 21 and 21' and the back yoke 22 magnetically and mechanically interconnect the upper yoke plate 20 and the lower yoke plate 20'.

In the embodiment of FIG. 4, the coil mounting base 12b is integrated with the carriage 12, and the coils 16 and 17 are bonded to the coil mounting base 12b, preferably using a so-called elastic bonding agent (for example, "Cemedyne EP-1", Cemedyne Corp.) which has adequate softness and damping effect, in place of an ordinary epoxy-based resin. The reason is that such an elastic bonding agent provides the effect of suppressing vibration of the coils by its damping effect. It is necessary to determine Young's modulus of the bonding agent and a thickness of the bonding agent to effectively suppress the vibration. It is more preferable to design a resonance frequency of a system, which consists of a mass of the coils and a rigidity of the bonding agent, to be equal to or higher than the resonant frequency of the actuator as whole.

Meanwhile, it is also preferable to fix coils to a carriage by molding, from a viewpoint of process and cost of processing a carriage and assembling two coils to the carriage. The coils are electrically coupled and then mounted to the coil mounting base, after which they are molded by a resin material to the base. As the resin material used for the molding, it is preferable to use a nylon material with glass mixed therein or a polypropylene styrene (PPS) composition, both of which have sufficient rigidity and are light weight. Moreover, it is further preferable to provide slits on the coil mounting base into which the coils are inserted and thereby structurally supported by the base, from a viewpoint of enhancing the strength of molding.

Figure 10:
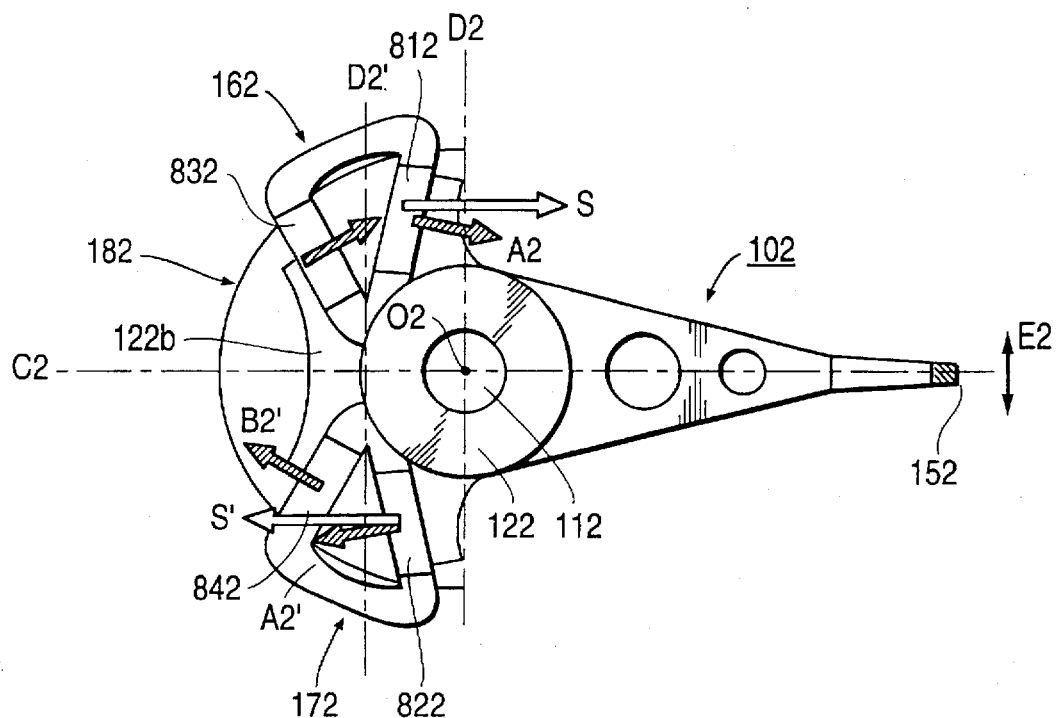
FIG. 10 is a top plane view of an alternative embodiment of the present invention in which the head actuator has triangularly shaped flat coils.

FIG. 10 is a top plane view of an alternative embodiment (second embodiment) of the present invention in which an actuator 102 has two flat coils 162 and 172 of triangular shapes, different from those of the first embodiment shown in FIGS. 4–6. The coil 162 (172) has a front portion 812 (822) and a rear portion 832 (842) which are inclined in an angular diverging relationship relatively to each other and in oppositely oriented diverging angular relationships relatively to a plane which includes an axis D2 of shaft 112 and a line D2' perpendicular to a line C2 which passes perpendicularly through the axis D2 and through the read/write head 152. The coil 162 produces a composite driving force S, as a total of component driving forces A2 and B2, respectively generated at portions 812 and 832 thereof. The coil 172 also produces a composite driving force S' as a total of component driving forces A2' and B2'. The driving forces S and S' are exactly perpendicular to a seek direction E2 and, for all practical purposes, are exactly balanced about a shaft 112. Therefore, vibration in a direction perpendicular the axis of rotation and which introduces frictional resistance to rotation of a bearing mounting the actuator 102 on a shaft 112, are reduced.

From a viewpoint of the respective directions of the driving forces S and S', the coils 162 and 172 are effectively perfectly-oriented because they never generate a component of force in a direction parallel to the seek direction E2. From a viewpoint of a rotating efficiency of the driving forces S and S', the efficiency in this embodiment is slightly less than the first embodiment. However, the actuator 102 has at least the potential of surpassing the performance of the first embodiment, as to over-all characteristics.

Meanwhile, the actuator 102 has the following advantages. (1) The actuator 102 affords increased space for reinforcing a the mounting and connection of the coils 162 and 172 to the coil surface mounting base 122b of the carriage 122, because the connecting surface areas therebetween are shifted toward the opposite side of the shaft 112 from head 152. (2) The actuator 102 is also smaller and better contoured than the actuators of the prior embodiments and thus provides increased space for attaching a flexible printed circuit board (FPC) 99, as shown in FIG. 5A, 5B, to the actuator 102. These advantages simplify the head actuator design.

Figure 11:
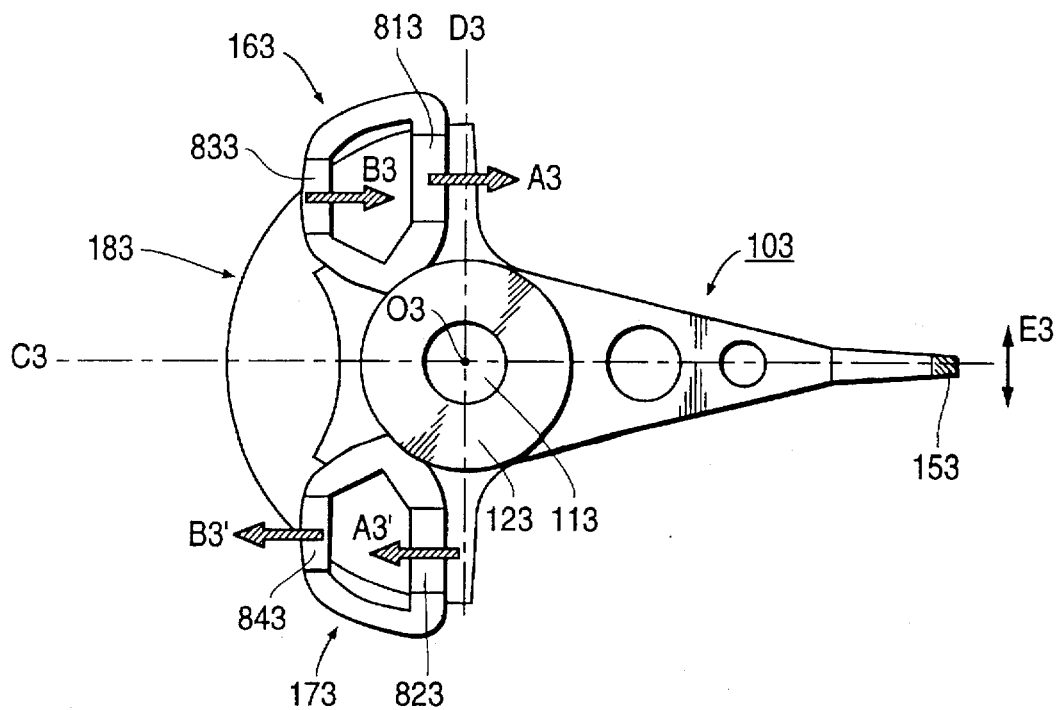
FIG. 11 is a top plane view of a further alternative embodiment of the present invention in which the head actuator has pentagonally shaped flat coils.

FIG. 11 is a top plane view of a further alternative embodiment (third embodiment) of the present invention in which the head actuator has pentagonally shaped flat coils. The effect is similar to that of the second embodiment shown in FIG. 10. In this head actuator 103, the coil 163 in cooperation with magnet 183, generates driving forces A3 and B3 at portions 813 and 833, respectively, and the driving forces A3 and B3 are exactly perpendicular to the seek direction E3. The coil 173 also generates driving forces A3' and B3' at portions 823 and 843, respectively. In the actuator 103, the rotational driving force of the portion 833 is reduced by 15%, because the portion 833 is inclined relatively to radial direction and, further, the magnet 183 (i.e., extends beyond the outer, periphery of the magnet 183). If more driving force for rotation is required, the portion 833 should be arranged fully within (i.e., between) the magnets. Moveover, for optimum directions of driving forces, the portion 833 may be slightly shifted toward the outside as shown in FIG. 11.

FIG. 12A is an alternative embodiment (fourth embodiment) of the present invention in which a head actuator 104 has a trapezoidally shaped flat coil 23. In this embodiment, two flat coils of the prior embodiments are replaced with one flat coil 23, which is formed substantially in a trapezoidal shape. The coil 23 generates respective driving forces at portions 231–234. These driving forces effectively are perfectly perpendicular to a seek direction E4 and balanced.

A rotating efficiency is about 90% for the portions 231 and 232, and about 70% for the portions 233 and 234, and thereby the rotating efficiency average is about 80% which is a little lower than the above embodiments. However, this embodiment has a most excellent performance as to the vibration characteristic, because any component of force in the direction parallel to the seek direction E4 is very small. Moveover, resistance of the coil 23 is a little superior to the double-coil. Therefore, this embodiment should be selected when not an improved rotating efficiency, but rather an improved vibration characteristic is required.

A reinforcement block 24 is shown in FIG. 12B and corresponds to the blocks 16a and 17a of FIG. 5B, discussed, supra. Thus, the block 24 is provided inside the coil 23 to support and reinforce the portions 233 and 234, because the coil 23 is large in size and the portions 233 and 234 are free. The reinforcement block 24 is made of an insulator, preferably a light-weight synthetic resin (for example, PPS, etc.,) having a high rigidity. Moveover, the reinforcement block 24 has holes 25 for reducing weight without loss of rigidity. In this embodiment, the coil 23 is wound around the reinforcement block 24.

This reinforcement block 24 can be provided not only for the trapezoidal coil of the embodiment of FIG. 12A but also for the coils of the above embodiments. The presence of a reinforcement blocks does have an effect on the resonance frequency; for example, in the case of the first embodiment shown in FIG. 4, the resonance frequency is changed by about 10% depending on the existence, or not, of the reinforcement block.

Meanwhile, in the actuator 104 using the trapezoid coil 23 of FIG. 12A, it is a little difficult to design a magnetic circuit because the portions 233 and 234 are inclined at about 45° relatively to the radial direction. Therefore, as shown in FIG. 12A, a magnet 27 has an outside circular edge 27a and an inside elliptical edge 27b. It is preferable to arrange the magnets so that a central segment 235 of the coil, extending between the coil portions 233 and 234, is not within the gap between the two magnets 27 but rather extends into the opening defined by the inside elliptical edge 27b (i.e., of each magnet of the pair of magnets 27). This is useful because the central section 235 generates a driving force in the radial direction which does not cause a rotating force; thus, by so displacing the central segment 235 relative to the magnets 27 so as to be outside the gap between the magnets 27, the undesired radial driving force is reduced. Accordingly, the illustrated shapes of the coil 22 and magnets 27 are not limited to those shown and it is possible to arrange various modifications which achieve this same relationship. Moreover, the magnet 27 has a generally elliptical interior edge and accordingly the cross-sectional width of the rear portions 233 and 234 decreases gradually for increasing distances from the shaft 114.

Meanwhile, it is also possible to arrange the coil 23 so that the rear portions 233 and 234 are inclined toward the radial direction, similarly to the first embodiment shown in FIG. 4–6, and the characteristic thereof is also made similar to the first embodiment. However, the embodiment of FIG. 12A is superior to that of FIG. 4 in view of reduced assembly cost, because only one coil is required.

FIG. 13 is an alternative embodiment of the present invention in which the head actuator has increased tolerance with respect to avoiding interference between disks and heads. In a head actuator 105, a coil 165 generates a driving force S5 as a total of respective driving forces generated at portions 815 and 835, and a coil 175 also generates a driving force S5' as a total of driving forces generated at portions 825 and 845. In actuators having a pair of symmetrically disposed coils, as in the preceding embodiments, the coil in the position of coil 165 of the actuator 105 of FIG. 13 would be more closely adjacent the disks 1 than the other coil 175, potentially interfering with the disks 1. To avoid that interference and in accordance with the embodiment of FIG. 13, the pair of coils 165 and 175 are rotationally displaced from the normal aligned relationship with the line D5 and instead are in aligned relationship with the line D5' which is rotationally displaced from the line D5 in a counterclockwise direction. Stated alternatively, in the preceding embodiments of FIGS. 4–12A, each of the corresponding lines C1–C4 may be viewed as comprising a first line perpendicular to and extending from the carriage axis in a first direction through the recording head and a second line perpendicular to and extending from the associated carriage axis in a second, substantially opposite direction but wherein, in each instance, the first and second lines are coincident and constitute a single, or common, line. By comparison to the arrangements of FIGS. 4–12A, the arrangement of rig. 13, by the rotational displacement of the coils 165 and the associated line D5', relatively increases the distance between the coil 165 and the circumference of the disks 1 without introducing any adverse decrease in the spacing between the coil 175 and the circumferential edge of the disks 1. This increases the margin of error and thus avoids interference between the disks 1 and the coil 165.

The coils 165 and 175 are similar in shape to the second embodiment shown in FIG. 10. The driving forces S5 and S5' are perfectly parallel to the line C5' and, effectively, are perfectly balanced about the shaft 115. Therefore, although the line C5' is not perfectly perpendicular to the seek direction E5, the frictional forces tending to oppose free rotation of the bearing, which mounts the actuator 105 on the shaft 114, are reduced while still maintaining a sufficient vibration characteristic for the actuator 105. Moreover, since the coils 165 and 175 are arranged with an inclination, it is easier to obtain perfectly balanced drive than with the other embodiments since the two coils 165 and 175 effectively can be disposed closer to a plane including the line D5' and passing through the axis of the shaft 115 than they could be aligned, instead, with a plane including the line D5, as shown by, for example, the distance between the coils 16 and 17 of the actuator 110 of FIG. 4 relatively to the line D1. It can also be seen that the axis of the actuator 10 in FIG. 4 is displaced farther from the circumference of the disks 1 whereas the rotated, or inclined, relationship of the coils 165 and 175 in FIG. 13 permits a closer spacing between the axis of shaft 115 and the circumference of the disks 1.

When the perfectly balanced drive is realized and, as before noted, frictional reaction forces opposing free rotation of the bearing on the shaft are eliminated, the rigid body mode does not occur. A primary moment in the longitudinal direction, moreover, is well-balanced but a primary moment in the lateral direction is a little unbalanced. However, since the lateral unbalance is small, it is easy to cancel same with a balancing counterweight, and thus it is possible to obtain effectively perfect balance for the lateral direction primary moment.

By comparison with FIG. 4, the embodiment of FIG. 13 employs coils 165 and 175, similar to the coils 16 and 17 of FIG. 4, but the same are set at an inclined angle, as above discussed. As before noted, the total driving forces of the coils 16 and 17 in the FIG. 4 embodiment are not perfectly perpendicular to the seek direction E1. The displacement to the inclined position of the coils 165 and 175 in the embodiment of FIG. 13, however, does not introduce any significant adverse changes in the vibration characteristic. This is because, whereas the driving force S5 of coil 165 is shifted so as to be less perpendicular to the seek direction E5 in FIG. 13 (relative to the corresponding driving force of coil 16 in FIG. 4), the driving force S5' of the coil 175 in FIG. 13 becomes more closely perpendicular to the seek direction E5 (as compared with the corresponding driving force of coil 17 in the FIG. 4 embodiment).

Figure 14:
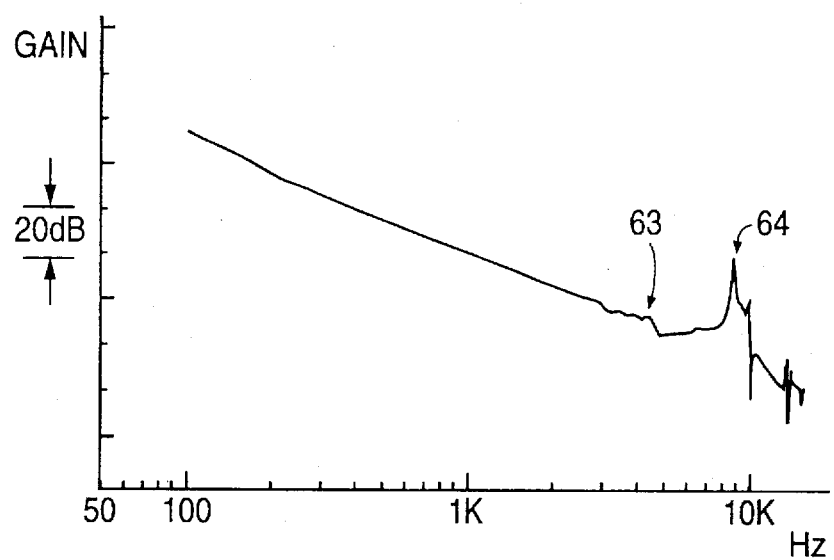
FIG. 14 is a plot of a vibration-frequency characteristic of the head actuator of the present invention of FIG. 4.

FIG. 14 is a plot of a compliance-frequency characteristic of the head actuator of the FIG. 4 embodiment of the present invention. The compliance-frequency characteristic indicates an output amplitude (displacement or force) of a head for an input current of a head actuator at each frequency (Hz). In the first embodiment shown in FIG. 4, the main resonance frequency 64 occurs at about 9.6 kHz (i.e., under 10 kHz) and therefore the compliance-frequency characteristic is almost linear, up to the resonance frequency 64. In FIG. 14, the resonance frequency of the rigid body mode occurs near 5 kHz and is negligible, being of about 1–2 dB.

Figure 2:
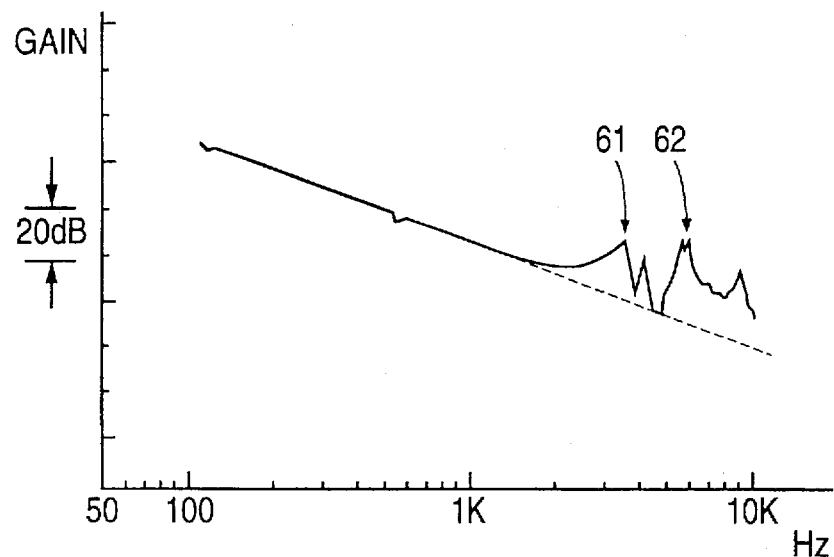
FIG. 2 is a plot of a compliance-frequency characteristic of the prior art head actuator of FIG. 1.

In comparison with the characteristic of the prior art shown in FIG. 2, the characteristic of the first embodiment shown in FIG. 4 is excellent. In the prior art of FIG. 2, this first-occurring resonance frequency 61 is at about 2–4 kHz, but the first-occurring resonance frequency 64 in the first embodiment is at about 10 kHz. Moreover, in the first embodiment, vibration of the rigid body mode at the resonance frequency 63 is suppressed remarkably. Such an effect is achieved by the arrangement of the coils as shown in FIG. 4. Therefore, it is possible to obtain a wide servo band and thereby excellent positioning accuracy of the actuator.

The following Table 1 compares performance characteristics of the prior art and of the present invention (low speed type and high speed type).

Table 1: Performance of Type 1/Type 2/Type 3

Type 1: Prior art shown in FIG. 1

Type 2: Present invention shown in FIGS. 4–6 (low speed type)

Type 3: Present invention shown in FIGS. 4–6 (High speed type)

(1) Equivalent mass of end point (g): 2.68/2.02/2.02

(2) Equivalent torque coefficient of end point (N/A): 1.55/3.93/2.08

(3) Acceleration coefficient (G/A): 58.8/208/110.8

(4) Resistance (Ω): 8.2/29.1/8.2

(5) Maximum acceleration (G): 71.7/71.5/135

(6) Seek time (ms): 8.0/8.0/5.8

(7) Power consumption (ratio): 1.00/0.34/1.00

For the purpose of comparison, the Type 2, using a dual-coil actuator shown in FIGS. 4–6, is designed so as to obtain the same acceleration and seek time as the Type 1 using a single-coil actuator shown in FIG. 1. In this case, the electric power consumption of Type 2 is about ⅓ that of Type 1, achieved by an increase of coil volume and an optimization of the inertia moment.

Conversely, the Type 3 is designed so as to consume the same amount of electric power as the Type 1. The actuator of the Type 3 has the almost same structure as the Type 2, except for the diameter of the coil wire; therefore, the coil of the Type 3 has a resistance different from that of the Type 2. In this case, the Type 3 has a higher acceleration and thus a shorter seek time than the Types 1 and 2, and especially, an extraordinarily short seek time of as small as 5.8 ms, which is less than that of the Types 1 and 2 by 2.2 ms.

Therefore, it is possible to provide, relative to conventional actuators (i.e., Type 1) both an improved low speed type actuator (Type 2) and an improved high speed type actuator (Type 3), depending on the needs of the market; that is, disk drives of the Type 2 are provided to users that want lower electric power consumption while maintaining at least the acceleration and seek time characteristics of a conventional actuator (i.e., Type 1) and disk drives of the Type 3 are provided to users that want a higher seek speed but without an increase in power consumption, relative to conventional actuators (i.e., Type 1).

What is claimed is:

1. A rotary moving coil actuator for selectively positioning a read/write head with respect to a rotating disk medium in a disk drive, said actuator comprising:

a carriage pivotable about an axis and having a carriage arm for supporting the read/write head, the read/write head being displaced from the axis in a first direction along a first line which is perpendicular to the axis and passes through the axis and the read/write head;

a pair of yoke plates fixed on the disk drive in spaced relationship;

a pair of magnets fixed between said pair of yoke plates and having respective flat faces which are perpendicular to the axis and which face each other with a gap therebetween;

a pair of flat coils attached to said carriage, displaced from the axis along a second line which is perpendicular to and passes through the axis, in a second direction substantially opposite the first direction, and disposed perpendicular to the axis and at least in part in the gap between, and facing, the flat faces of said magnets, the pair of flat coils being movable along a stroke of movement relative to the flat faces of said magnets; and the flat coils, in cooperation with said magnets, generating a driving force in a direction approximately parallel to the second line.

2. The actuator of claim 1, wherein the flat coils of the pair thereof are symmetrically disposed with respect to, and on opposite sides of, a plane which substantially includes both the axis and the second line and the flat coils generate respective driving forces which are substantially oppositely oriented and symmetrical with respect to the plane.

3. The actuator of claim 1, wherein the flat coils of the pair thereof are symmetrically disposed with respect to, and on opposite sides of, a plane which substantially includes the axis and the second line and is rotated about the axis so as to be inclined angularly away from the first line and toward a center of the rotating disk medium and such that the flat coils generate respective driving forces which are substantially oppositely oriented and symmetrical with respect to the plane.

4. The actuator of claim 1, wherein each coil comprises a first portion which extends in a direction approximately perpendicular to the second line.

5. The actuator of claim 4, wherein each coil further comprises a second portion spaced from the first portion, the first and second portions being disposed respectively, and relatively, closer to and farther from the rotating disk medium.

6. The actuator of claim 5, wherein the second portions of said flat coils extend in a direction approximately perpendicular to the second line.

7. The actuator of claim 5, wherein the second portions of said flat coils extend in a direction which is inclined at an angle of up to 30° from a radial direction, relatively to the axis and perpendicular to the second line.

8. The actuator of claim 5, wherein, relatively to a plane including the axis and perpendicular to the second line, the first portions of said flat coils are disposed with a predetermined offset from the plane and at an opposite side of the plane from the read/write head.

9. The actuator of claim 1, wherein each flat coil comprises a first portion and a second portion, the first and second portions being inclined in an angular diverging relationship relatively to each other and an oppositely diverging angular relationship relatively to a plane which is perpendicular to the second line and disposed between the first and second portions.

10. The actuator of claim 9, wherein said plane is displaced from the axis along the second line in a direction away from the read/write head.

11. The actuator of claim 1, wherein each of said magnets has four poles spaced at approximately common intervals in a direction of the stroke of movement of the flat coil.

12. The actuator of claim 1, wherein each of said magnets comprises a corresponding central pole and a corresponding pair of opposite end poles integrally interconnected by the corresponding central pole and configured in correspondence with the stroke of movement of the flat coils, the end poles having a common length and the central pole being substantially twice as long as each of the end poles.

13. The actuator of claim 1, further comprising:
a pair of side yoke blocks respectively connecting opposite ends of one said yoke plate to corresponding opposite ends of the other said yoke plate of the pair thereof; and
a back yoke block connecting a central portion of said one yoke plate to a central portion of the other said yoke plate and displaced outside the stroke of movement of the flat coils.

14. A rotary moving coil actuator as recited in claim 1, further comprising:
a resilient connector, having a predetermined elasticity, connecting said pair of flat coils to said carriage.

15. A rotary moving coil actuator as recited in claim 14, wherein the resilient connector comprises an elastic bonding agent damping vibration of the actuator produced by the driving force.

16. A rotary moving coil actuator as recited in claim 1, wherein the first and second line are coincident and constitute a common line.

17. A rotary moving coil actuator for selectively positioning a read/write head with respect to a rotating disk medium in a disk drive, said actuator comprising:
a carriage pivotable about an axis and having a carriage arm for supporting the read/write head, the read/write head being displaced from the axis in a first direction along a first line which is perpendicular to the axis and passes through the axis and the read/write head;
a pair of yoke plates fixed on the disk drive in spaced relationship;
a pair of magnets fixed between said pair of yoke plates and having respective flat faces which are perpendicular to the axis and which face each other with a gap therebetween;
a flat coil attached to said carriage, displaced from the axis along a second line in a second direction, opposite to the first direction, and disposed perpendicular to the axis and at least in part in the gap between, and facing, the flat faces of said magnets, the flat coil being movable relatively to, and through a stroke of movement along, the flat faces of said magnets; and
said flat coil, in cooperation with said magnets, generating a driving force in a direction approximately parallel to the second line.

18. The actuator of claim 17, wherein said flat coil is substantially of a trapezoidal configuration.

19. The actuator of claim 18, wherein said flat coil comprises a first portion and a second portion, spaced from the first portion, the first and second portions being disposed respectively, and relatively, closer to and farther from the rotating disk medium.

20. The actuator of claim 19, wherein, relatively to a plane including the axis and perpendicular to the second line, the first portion of said flat coil is disposed with a predetermined offset from the plane and from an opposite side of the plane relative to the read/write head.

21. The actuator of claim 18, wherein said flat coil is symmetrically disposed with respect to a first plane, the first plane approximately including the axis and the second line.

22. The actuator of claim 21, wherein the first plane passes through the axis and is rotated about the axis so as to be angularly inclined away from the first line and toward a center of the rotating disk medium.

23. The actuator of claim 18, wherein each of said magnets is formed in shape of an arc and has a varying width in a radial direction which is relatively smaller in a central portion thereof and relatively wider in opposite side portions thereof.

24. The actuator of claim 23, wherein each of said magnets has an inner, semi-elliptical edge surrounding the axis and an outer semi-circularly edge.

25. The actuator of claim 18, further comprising a base substantially of a trapezoidal configuration, said flat coil being wound around the base.

26. The actuator of claim 25, wherein said base has a hole.

27. A rotary moving coil actuator as recited in claim 17, wherein a resilient connector, having a predetermined elasticity, connecting said flat coil to said carriage.

28. A rotary moving coil actuator as recited in claim 27, wherein the resilient connector comprises an elastic bonding agent damping vibration of the actuator produced by the driving force.

29. A rotary moving coil actuator as recited in claim 17, wherein the first and second line are coincident and constitute a common line.

30. A rotary moving coil actuator for selectively positioning a read/write head in a disk drive, said actuator comprising:
a carriage mounted for pivotal movement about a carriage axis oriented in a first direction and having a carriage arm extending radially, relatively to the carriage axis, the carriage arm having a free end supporting the read/write head, the read/write head being displaced from the axis in a first direction along a first line which is perpendicular to the axis and passes through the carriage axis and the read/write head;
a pair of upper and lower yoke plates mounted at fixed positions in the disk drive, in spaced relationship in the first direction and defining a first gap therebetween;
a pair of upper and lower magnets mounted at fixed positions between, and respectively contiguous to, said pair of upper and lower yoke plates, said upper and lower magnets having corresponding flat faces disposed perpendicularly to the carriage axis and in parallel, spaced relationship in the first direction and which define a second gap therebetween;
a first flat coil attached to said carriage and having corresponding upper and lower surfaces respectively lying in upper and lower, common planes perpendicular to the carriage axis, at least portions of the flat coil being disposed within the second gap and in spaced, facing relationship relatively to the corresponding flat faces of said upper and lower magnets, the flat coil being displaced from the axis along a second line which is perpendicular to the axis, in a second direction substantially opposite the first direction, and being movable, in common pivotal movement with the carriage, about the carriage axis and thereby along a stroke of movement relatively to the corresponding flat faces of said upper and lover magnets; and
the first flat coil conducting an electrical current therethrough and generating a magnetic field and, in cooperation with corresponding magnetic fields of said upper and lover magnets, producing a driving force substantially parallel to the second line, for selectively driving the carriage in pivotal movement about the axis.

31. A rotary moving coil actuator as recited in claim 30, wherein the first and second line are coincident and constitute a common line.

32. A rotary moving coil actuator as recited in claim 30, wherein;
   the disk drive receives and drives a rotary disk, having a recording medium surface and a circular periphery, in rotation about a disk axis of rotation which is displaced from the carriage axis by a distance corresponding substantially to a distance from the carriage axis to the read/write head, movement of the carriage through the stroke of movement thereof correspondingly moving the read/write head through a substantially radial read/write head seek movement stroke relatively to the disk axis and extending between an inner position adjacent the disk axis and an outer position adjacent the periphery of the disk; and
   the first and second lines are coincident and constitute a common line.

33. A rotary moving coil actuator as recited in claim 30, wherein:
   the disk drive receives and drives a rotary disk, having a recording medium surface and a circular periphery, in rotation about a disk axis of rotation which is displaced from the carriage axis by a distance corresponding substantially to a distance from the carriage axis to the read/write head, movement of the carriage through the stroke of movement thereof correspondingly moving the read/write head through a substantially radial read/write head seek movement stroke, relatively to the disk axis and extending between an inner position adjacent the disk axis and an outer position adjacent the periphery of the disk; and
   the second line is rotated about the carriage axis so as to be angularly inclined relatively to the first line in a direction along the read/write head seek movement stroke from the disk periphery and toward the disk axis.

34. A rotary moving coil actuator as recited in claim 30, further comprising:
   a second flat coil attached to said carriage and of a complementary configuration to that of the first flat coil, the first and second flat coils being oppositely displaced in a transverse direction from a plane including the carriage axis and the second line, the first and second flat coils commonly conducting electrical current therethrough and, in cooperation with corresponding magnetic fields of said upper and lower magnets, generating respective magnetic fields producing respective, oppositely oriented first and second driving forces, substantially parallel to and on respective, opposite sides of the second line and which combine in additive relationship to selectively drive the carriage in pivotal movement about the carriage axis.

35. A rotary moving coil actuator as recited in claim 34, wherein the first and second lines are coincident and constitute a common line.

36. A rotary moving coil actuator as recited in claim 34, wherein:
   the disk drive receives and drives a rotary disk, having a recording medium surface and a circular periphery, in rotation about a disk axis of rotation which is displaced from the carriage axis by a distance corresponding substantially to a distance from the carriage axis to the read/write head, movement of the carriage through the stroke of movement thereof correspondingly moving the read/write head through a substantially radial read/write head seek movement stroke, relatively to the disk axis and extending between an inner position adjacent the disk axis and an outer position adjacent the periphery of the disk; and
   the first and second lines are coincident and constitute a common line.

37. A rotary moving coil actuator as recited in claim 34, wherein:
   the disk drive receives and drives a rotary disk, having a recording medium surface and a circular periphery, in rotation about a disk axis of rotation which is displaced from the carriage axis by a distance corresponding substantially to a distance from the carriage axis to the read/write head, movement of the carriage through the stroke of movement thereof correspondingly moving the read/write head through a substantially radial read/write head seek movement stroke, relatively to the disk axis and extending between an inner position adjacent the disk axis and an outer position adjacent the periphery of the disk; and
   the second line is rotated about the carriage axis so as to be angularly inclined relatively to the first line in a direction along the read/write head movement stroke from the disk periphery and toward the disk axis.

38. A rotary moving coil actuator as recited in claim 30, wherein a resilient connector, having a predetermined elasticity, connecting said first flat coil to said carriage.

39. A rotary moving coil actuator as recited in claim 38, wherein the resilient connector comprises an elastic bonding agent damping vibration of the actuator produced by the driving force.

* * * * *

UNITED STATES PATENT AND TRADEMARK OFFICE
CERTIFICATE OF CORRECTION

PATENT NO. : 5,764,441
DATED : June 9, 1998
INVENTOR(S) : Keiji ARUGA et al.

It is certified that error appears in the above-identified patent and that said Letters Patent is hereby corrected as shown below:

Col. 16, line 60 (Claim 30, line 35), change "lover" to --lower--;
line 64 (Claim 30, line 39), change "lover" to --lower--.

Signed and Sealed this

Eighth Day of December, 1998

Attest:

BRUCE LEHMAN

Attesting Officer        Commissioner of Patents and Trademarks